Aug. 7, 1951  G. E. FERGUSON  2,563,326
OSCILLATING PLANT THINNING MACHINE
Filed Sept. 14, 1946  2 Sheets-Sheet 1
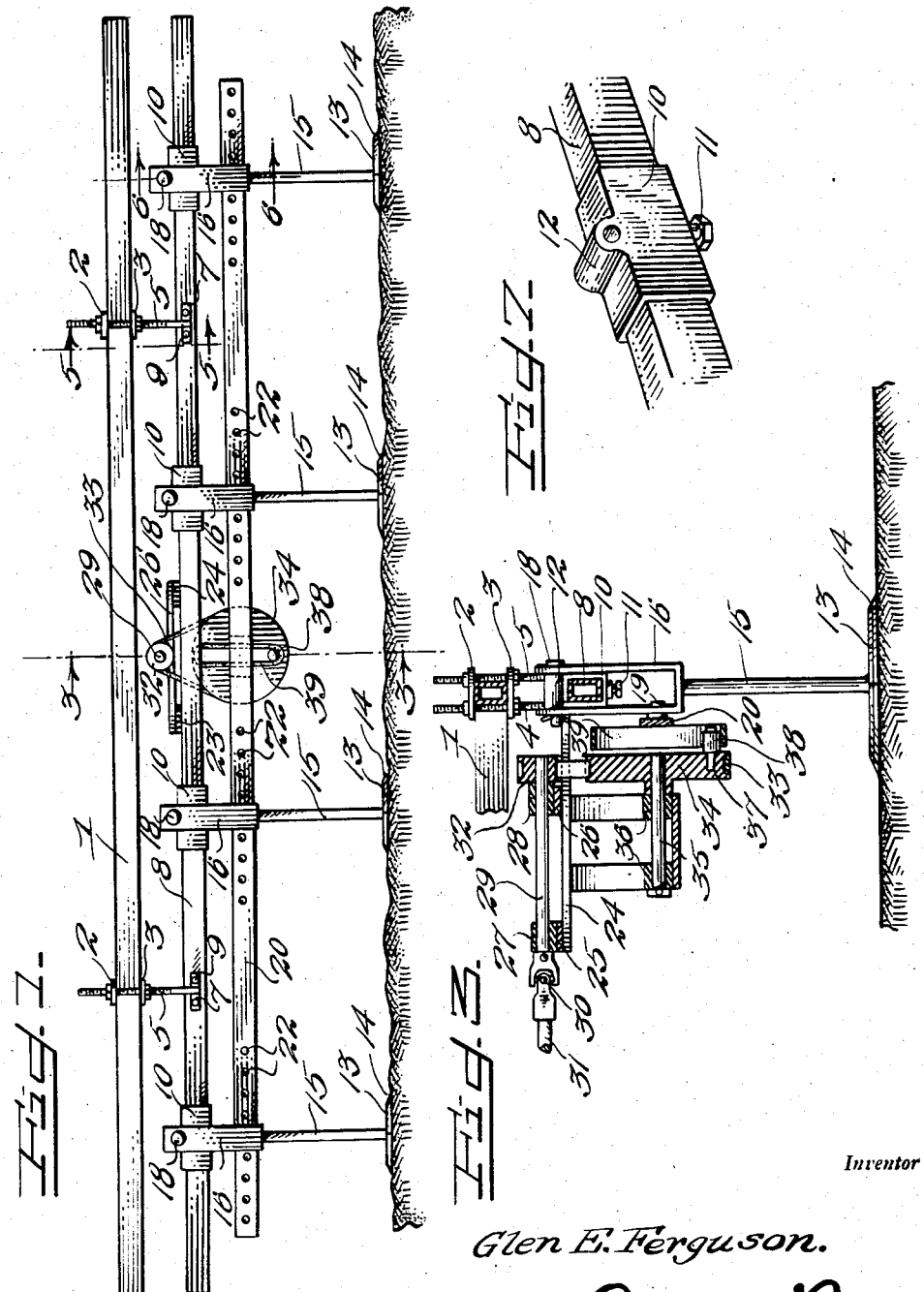
Inventor
Glen E. Ferguson.
By
Attorneys

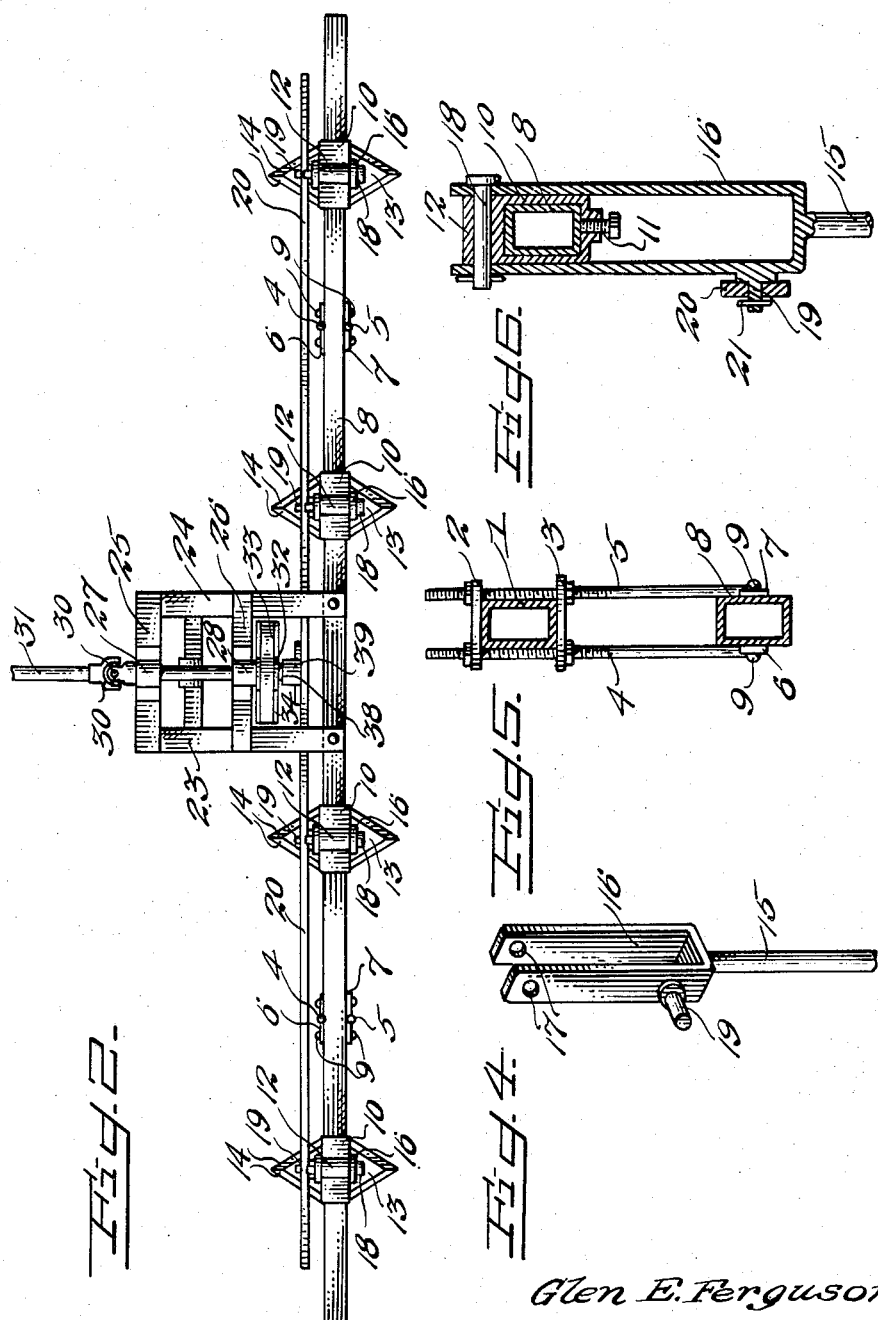

Patented Aug. 7, 1951

2,563,326

UNITED STATES PATENT OFFICE 2,563,326

OSCILLATING PLANT THINNING MACHINE

Glen E. Ferguson, Miles City, Mont., assignor, by direct and mesne assignments, of seventy-seven and one-half per cent to Tera Ethel Ferguson, Miles City, seven and one-half per cent to Gene Herschel Ferguson, Forsyth, seven and one-half per cent to Jack Lee Ferguson, Miles City, and seven and one-half per cent to Henry Larson, Rosebud, Mont.

Application September 14, 1946, Serial No. 696,985

4 Claims. (Cl. 97—19)

This invention relates to improvements in an agricultural row crop cultivator, and more particularly to a beet, cotton and vegetable thinning and blocking machine.

An object of the invention is to provide an improved row crop cultivating device for attaching to any conventional cultivator for mechanically blocking, thinning and chopping beets, cotton or other row crops thereby saving time and expensive hand labor formerly used for this type of crop cultivation.

Another object of the invention is to provide an improved row crop cultivating device for attaching to any conventional cultivator including a transversely extending series of oscillating blocking knives adapted to be swung back and forth across a number of rows of plants at regular timed intervals as the cultivator is drawn along said rows in a forward direction, thereby blocking, thinning and chopping the row crops as desired.

A further object of the invention is to provide a device of the character described in which the knives will be self-cleaning and adjustable as to the depth of cut, also adjustable as to row width.

Another object of the invention is to provide an improved row crop blocking, thinning and chopping device which may be attached to any conventional cultivator and operated from the power take-off on the tractor through any desired mechanical movement or hook-up linkage.

Other objects will appear as the description proceeds.

In the accompanying drawings which form a part of this application,

Figure 1 is a rear elevation of the improved row crop thinning and blocking machine;

Figure 2 is a plan view of the improved row crop thinning and blocking machine;

Figure 3 is a sectional view taken on the line 3—3 of Figure 1;

Figure 4 is a perspective view of the supporting yoke on the upper end of a knife supporting shank showing the lateral stub shaft for attaching to a connecting rod;

Figure 5 is a sectional view taken on the line 5—5 of Figure 1;

Figure 6 is a sectional view taken on the line 6—6 of Figure 1, and

Figure 7 is a perspective view of a blade supporting bearing sleeve on a tool supporting bar.

Like characters of reference are used throughout the following specification and the accompanying drawings to designate corresponding parts.

In carrying out the invention, there is provided any desired conventional cultivator having a tool bar 1, to which the improved device is attached by means of the spaced clamping plates 2 and 3 extending above and below said tool bar 1, the same being connected together by means of the spaced elongated depending bolts 4 and 5, which in turn support the bracket members 6 and 7 attached to the front and rear surfaces of the tool bar 8 of the attachment by means of the bolts 9, thereby supporting the tool bar 8 in fixed position below the cultivator tool bar 1.

A plurality of sleeves 10 are slidably and adjustably supported upon the tool bar 8, being held in the desired spaced relation thereon by means of the set bolts 11, and are provided with the integral forwardly and rearwardly extending apertured bearings 12 on their upper sides.

The improved blocking and thinning knives 13 are of diamond shape being sharpened on all four sides or edges as at 14, and are formed on the lower ends of the shanks 15, which in turn are provided with the integral U-shaped yokes 16 which are formed with aligned apertures 17 through which the pivot pins 18 will extend when said yokes are positioned on the opposite sides of the sleeves 10 with their apertures aligned with the apertured bearings 12 in said sleeves, thereby providing for an oscillating motion or pendulum motion crosswise of the rows of crops as the cultivator is pulled forwardly along the crop rows.

Stub shafts 19 will extend forwardly of the lower ends of each front yoke arm 16, the same being connected together by means of the apertured connecting rod 20, which overlies said stub shafts 19, being held in place by the cotter pins or keys 21, so that pivotal movement of the blocking and thinning knives will be synchronized when operated. Adjusting apertures 22 will be formed through the connecting rod 20 to provide for adjusting the knives to various spaces between the crop rows.

A pair of spaced forwardly extending bracket arms 23 and 24 will be secured to the tool bar 8, and will be reinforced by the cross-arms 25 and 26, which in turn support the aligned bearings 27 and 28 through which the driving shaft 29 extends. A universal coupling 30 connects the forward end of the shaft 29 with the shaft 31 connected to the usual power take-off on the tractor (not shown) which pulls and operates the cultivator. A pulley 32 is secured to the rear end of the shaft 29, and is connected by the belt 33 to the large pulley wheel 34 on the end of the shaft 35 rotatably mounted in the depending frame 36 supported by and below the bracket arms 23 and 24. A pin 37 extends rearwardly from the pulley wheel 34 adjacent the periphery thereof and supports the roller 38, which in turn is received within the vertical roller guide 39 secured in fixed position upon the connecting rod 20.

From the foregoing description, it will be apparent that as the tractor draws the cultivator along the crop rows, and power from the tractor take-off is transmitted to the attachment, the Pitman drive will cause the knives to oscillate back and forth at timed intervals to mechanically block and thin the crop rows. As the knives reach their uppermost position at each end of a swing, the crops which were cut or thinned, if on said knives, will drop therefrom between the crop rows. As before mentioned, the device may be adjusted for depth of cut by selectively raising and lowering the tool bar 8 relative to the bar 1 and for varying distances between the crop rows by the placing of the pins 19 in selected apertures 22, also a simple speed adjustment will provide for the length of block or stand of plants that is desired.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a tractor drawn cultivator of a row crop blocking and thinning machine comprising, a tool bar adjustably secured to the cultivator, bearing sleeves received on said bar and longitudinally adjustable therewith, yoke supported knives mounted on said bearing sleeves, an elongated connecting rod having a group of longitudinally spaced openings, pivot pins received in selected ones of said openings and connecting said yokes to said rod for simultaneous movement of said knives, and means for reciprocating said rod.

2. An agricultural implement for blocking and thinning row crops, said implement comprising an elongated tool bar, a plurality of sleeves slidably received on said bar, set screws threaded in said sleeves for bearing against the bar to retain the sleeves in longitudinally adjusted position on the bar, knives having upstanding shanks, said shanks having upper end portions, yokes at the upper end portions of said shanks embracing said sleeves, journals secured to said sleeves and disposed transversely of said bar, pivot pins carried by the yokes and received in said journals for vertical swinging movement of said shanks on said sleeves, a connecting rod spaced parallel to said bar, further pivot pins securing said yokes to said rod, a roller guide secured to said rod, a support mounted on said bar, a rotatable member journaled on said support, an eccentrically mounted roller on said member received in said guide, and means associated with said rotatable member for driving the latter to transfer rotary motion of said rotatable member to oscillatory motion to said rod and said shanks.

3. An agricultural implement for blocking and thinning row crops, said implement comprising an elongated tool bar, a plurality of sleeves slidably received on said bar, set screws threaded in said sleeves for bearing against the bar to retain the sleeves in longitudinally adjusted position on the bar, knives having upstanding shanks, said shanks having upper end portions, yokes at the upper end portions of said shanks embracing said sleeves, journals secured to said sleeves and disposed transversely of said bar, pivot pins carried by the yokes and received in said journals for vertical swinging movement of said shanks on said sleeves, a connecting rod spaced parallel to said bar, further pivot pins securing said yokes to said rod, a roller guide fixed to said rod and having a vertical slot therein, a support mounted on said bar, a drive shaft journaled on said support, a first pulley on said drive shaft, a driven shaft journaled on said support, a second pulley on said driven shaft, an endless belt trained about said pulleys, and an eccentrically mounted roller on said second pulley received in said vertical slot to impart reciprocation to said rod and said shanks upon rotation of said shafts.

4. An agricultural implement for blocking and thinning row crops, said implement comprising an elongated tool bar, a plurality of sleeves slidably received on said bar, means carried by the sleeves for engaging the bar to retain the sleeves in longitudinally adjusted position on the bar, knives having upstanding shanks, said shanks having upper end portions, yokes at the upper end portions of said shanks embracing said sleeves, journals secured to said sleeves and disposed transversely of said bar, pivot pins carried by the yokes and received in said journals for vertical swinging movement of said shanks on said sleeves, a connecting rod spaced parallel to said bar, further pivot pins securing said yokes to said rod, a roller guide secured to said rod, a support mounted on said bar, a rotatable member journaled on said support, an eccentrically mounted roller on said member received in said guide, and means associated with said rotatable member for driving the latter to transfer rotary motion of said rotatable member to oscillatory motion to said rod and said shanks.

GLEN E. FERGUSON.

REFERENCES CITED

The following references are of record in the file of this patent:

UNITED STATES PATENTS

| Number | Name | Date |
| --- | --- | --- |
| 370,875 | Jordan | Oct. 4, 1887 |
| 378,443 | Harper et al. | Feb. 28, 1888 |
| 852,194 | Odom | Apr. 30, 1907 |
| 1,029,282 | Fargason | June 11, 1912 |
| 1,100,239 | Hickson | June 16, 1914 |
| 1,895,665 | Johnson | Jan. 31, 1933 |